United States Patent
Stubbs et al.

(10) Patent No.: US 7,161,261 B2
(45) Date of Patent: Jan. 9, 2007

(54) DOOR LOCKING CONTROL APPARATUS

(75) Inventors: Timothy Christopher Stubbs, Birmingham (GB); Michael John Chawner Golding, Bridgnorth (GB)

(73) Assignee: Fortress Interlocks Limited (GB)

( * ) Notice: Subject to any disclaimer, the term of this patent is extended or adjusted under 35 U.S.C. 154(b) by 644 days.

(21) Appl. No.: 10/685,138

(22) Filed: Oct. 14, 2003

(65) Prior Publication Data

US 2004/0083014 A1    Apr. 29, 2004

(30) Foreign Application Priority Data

Oct. 14, 2002    (GB)    ................................. 0223765.9

(51) Int. Cl.
   *B60L 1/00*    (2006.01)
(52) U.S. Cl. .................................................... 307/10.1
(58) Field of Classification Search ................ 307/10.1
   See application file for complete search history.

(56) References Cited

U.S. PATENT DOCUMENTS

| | | | | |
|---|---|---|---|---|
| 4,983,950 A | * | 1/1991 | Sunami | ................. 340/426.28 |
| 5,240,296 A | * | 8/1993 | Kobayashi | ................... 292/201 |
| 5,564,761 A | * | 10/1996 | Mizuki et al. | ............... 292/201 |
| 6,547,185 B1 | * | 4/2003 | Erben et al. | .............. 244/129.5 |

* cited by examiner

*Primary Examiner*—Stephen W. Jackson
(74) *Attorney, Agent, or Firm*—Andrus, Sceales, Starke & Sawall, LLP

(57) ABSTRACT

A control method and apparatus for a door-locking mechanism which includes an electrically-released latch, to lock the door closed. A processing unit sources first and second data streams each of a repeating string of binary data, the two strings being of the same bit length and bit rate, the processing unit also having two sensing inputs. A normally-open first switch is associated with the latch and connects the first data stream to the first sensing input other than when the latch is released, and a normally-open second switch is associated with the door and serves to connect the second data stream to the second sensing input so long as the door remains closed. A normally-closed third switch is also associated with the door and serves to link together the first and second sensing inputs when the door is not closed. The processing unit outputs a signal indicative of an error condition should the data stream which appears at either sensing input not be the expected stream.

23 Claims, 11 Drawing Sheets

| | Data | Description |
|---|---|---|
| Data applied on A1: | 1001 | First Code nibble. |
| Data applied on A3: | 1010 | Second Code nibble. |
| Data received on A2: | 1001 | Same as transmitted on A1, therefore 'Healthy'. |
| Data received on A4: | 1010 | Same as transmitted on A3, therefore 'Healthy'. |
| Data sent on D0-D3 to AS-i interface: | 10011010 | (The second nibble is always different from the first.) |

Fig 1B

|  | Data | Description |
|---|---|---|
| Data applied on A1: | 1001 | First Code nibble. |
| Data applied on A3: | 1010 | Second Code nibble. |
| Data received on A2: | 0000 | Data bits on A1 are suppressed, therefore this is an 'Unsafe condition'. |
| Data received on A4: | 1010 | Same as transmitted on A3, therefore 'Healthy'. |
| Data sent on D0-D3 to AS-i interface: | 00001010 | At least 1 data bit is suppressed, causing the ASi monitor to stop. ASi monitor knows 'Channel 1' has been operated. |

Fig 2B

|  | Data | Description |
|---|---|---|
| Data applied on A1: | 1001 | First Code nibble. |
| Data applied on A3: | 1010 | Second Code nibble. This is always different from the first. |
| Data received on A2: | 0000 | Data bits from A1 are suppressed, therefore this is an 'Unsafe condition'. |
| Data received on A4: | 0000 | Data bits from A3 are suppressed, therefore this is an 'Unsafe condition'. |
| Data sent on D0-D3 to AS-i interface: | 00000000 | At least 1 data bit is suppressed, causing the ASi monitor to stop. ASi monitor knows 'Channel 2' has also been operated. |

Normally the Actuator would be re-inserted into the head of the interlock unit and the cycle would recommence from sheet 1. However, if someone tries to break the sequence, or a fault occurs, it will be detected instantly.

Fig 3B

|  | Data | Description |
|---|---|---|
| Data applied on A1: | 1001 | First Code nibble. |
| Data applied on A3: | 1010 | Second Code nibble. This is always different from the first. |
| Data received on A2: | 1000 | Some data bits have been suppressed. The data received is not the same as transmitted on A1, therefore this is an 'Unsafe condition'. |
| Data received on A4: | 1000 | Some data bits have been suppressed. The data received is not the same as transmitted on A3, therefore this is an 'Unsafe condition'. |
| Data sent on D0-D3 to AS-i interface: | 10001000 | At least 1 data bit is suppressed, causing the ASi monitor to stop. ASi monitor knows a fault has occurred. |

Fig 4B

DOOR LOCKING CONTROL APPARATUS

CROSS-REFERENCE TO RELATED APPLICATION

This application claims priority to Great Britain Application No. 0223765.9, filed Oct. 14, 2002.

BACKGROUND TO THE INVENTION a) Field of the Invention

This invention relates to control apparatus for a door-locking mechanism including an electrically-released latch for locking an associated door closed. In particular, this invention concerns industrial doors, guards, screens and so on, to protect industrial machinery or other processes which could be hazardous to operators.

b) Description of the Related Art

With increasing emphasis on the health and safety of employees, it is becoming ever more important to provide competent and reliable protection for industrial machinery or equipment operating processes which are hazardous to the personnel in the vicinity of that machinery. Most such machinery now is fitted with various kinds of doors, guards, screens or other equipment which restricts access to the machinery or the process being performed by the machinery, until the machinery has been made safe. All of such doors, guards, screens and the like and which are moveable between closed and open positions, respectively where access is restricted and access may be gained to industrial machinery or processes, are referred to hereinafter simply as "doors" irrespective of the precise nature of the door, guard, screen or the like.

A simple machine may be protected with a guard structure having a door moveable between the closed and open positions, as referred to above. With more complex machines, it is usually necessary to provide a number of such doors, all of which are interlinked in some way so as to ensure access can be gained only when it is safe to do so. Further, with yet more complex industrial processes, it may be necessary to interlink guards associated with different machines or equipment, such that in the event access is gained at one location to a process, then other action is taken to ensure safety at all protected locations.

In order to accommodate such complex machines and processes, it has been the conventional procedure to provide each door with an electrically-operated lock to hold the door closed, the lock being electrically-released only when it is safe to do so and so when the machinery or process being protected is in a safe condition. Typically, respective sensors are provided for all of the doors and the outputs from those sensors are used to inhibit restarting the machinery or process until all of the doors are in their closed positions.

As the complexity has increased, it has become more and more difficult to ensure complete safety, having regard to the number of sensors which must be provided, together with all of the wiring associated with those sensors and the electrically-operated locks. In an attempt to solve this problem, it is known to provide a bus system which uses relatively few wires (and typically only two or three) between all of the sensors and the locks, on which bus system appropriate control signals are carried to and from a computerised controller, running an appropriate program for operation of the machinery or industrial process as well as control of the doors protecting that machinery or process.

Such bus systems as described above are well known and are largely very effective. However, it is possible for a determined operator to gain access to machinery or industrial process by not properly closing a door and deliberately operating the associated door sensor (which typically is a mechanical switch) to simulate door closing. Further, and bearing in mind the electrically noisy environment within which such bus systems frequently have to operate, it is possible for false signals to be generated which permit restarting of machinery or which do not properly shut down machinery when that machinery is not properly guarded.

It is a principal aim of the present invention to address the above problem, and to increase the reliability and safety of a known design of centrally-controlled bus system for door locking, in a very simply and effective manner and without introducing extra control software or wiring.

BRIEF SUMMARY OF THE INVENTION

According to one aspect of the present invention there is provided control apparatus for a door-locking mechanism including an electrically-released latch for locking the door closed. The apparatus comprises:

(a) a processing unit having first and second data stream sources and first and second sensing inputs;

(b) a first sensor associated with the electrically released latch and which serves to connect the first data stream source to the first sensing input other than when the latch is in its released state;

(c) a second sensor associated with the door and which serves to connect the second data stream source to the second sensing input so long as the door remains closed; and (d) a third sensor also associated with the door and which serves to link together either the first and second data stream sources or the first and second inputs when the door is not closed.

The processing unit is arranged to output a signal indicative of an error condition should the data stream appearing at least at one of the sensing inputs not be the data stream which normally should appear at that input.

According to a further aspect of this invention there is provided a method of monitoring the state of a door fitted with an electrically-released latch which, when energised, allows the door to be opened. In the method:

(a) a processing unit sources first and second data streams and has first and second sensing inputs;

(b) the first data stream is connected to the first sensing input by a first sensor associated with the electrically released latch other than when the latch is in its released state;

(c) the second data stream is connected to the second sensing input by a second sensor associated with the door so long as the door remains closed; and (d) either the first and second sources or the first and second sensing inputs are linked together by a third sensor also associated with the door, whenever the door is not closed.

Then, the processing unit outputs a signal indicative of an error condition should the data stream appearing at least at one of the sensing inputs not be the data stream which normally should appear at that input.

It will be appreciated that with the control apparatus of this invention, or when performing the method also of this invention, a relatively minor modification to a known system allows enhanced reliability and safety, in use. By furnishing a third sensor which is also associated with the door and which serves to link together either the two signal sources or the two sensing inputs of the processing unit, it is possible to detect unauthorised or inappropriate operation of either the first or second sensors. The processing unit, by outputting a suitable error-condition signal for example to a bus system controlling protected machinery or an industrial process, may inhibit operation until the origin of the error condition has been corrected. The error condition could arise either through malicious action by an unauthorised person, through failure of one or more components of the overall system, or on account of electrical interference.

BRIEF DESCRIPTION OF THE DRAWINGS

In the following, and by way of example only, one specific embodiment of control apparatus and method of this invention will be described in detail, referring as required to the accompanying drawings. In the drawings:

FIG. 1B is a data table showing the data streams present in the apparatus in its "normal" condition of FIG. 1A;

FIGS. 2B, 3B and 4B are similar to FIG. 1B but for the apparatus in the conditions of FIGS. 2A, 3A and 4A, respectively.

DETAILED DESCRIPTION OF THE INVENTION

Figure 1A:
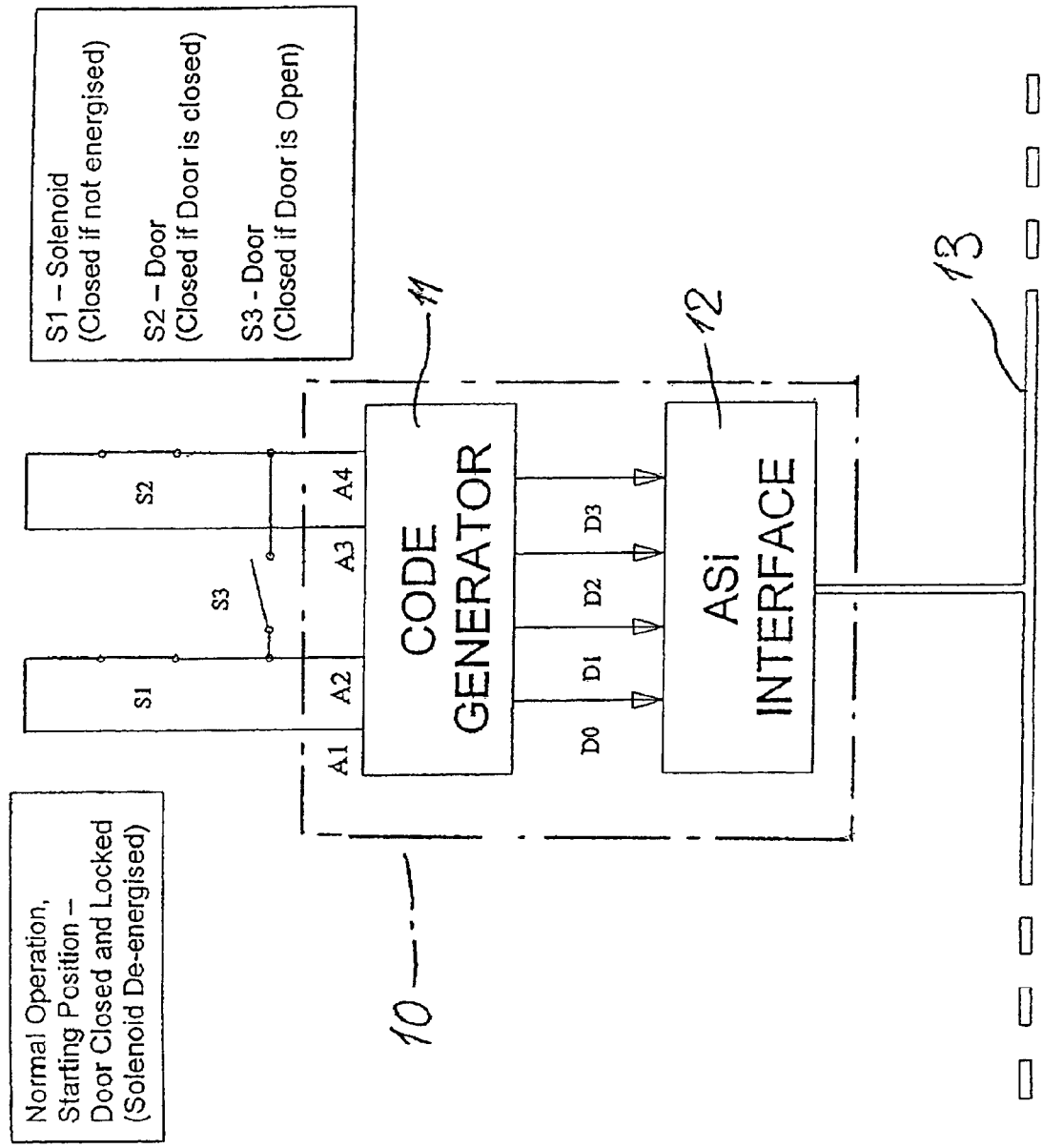
FIG. 1A diagrammatically represents the apparatus in a "normal" condition, with the door closed and locked.

In order to allow the control apparatus of this invention to interface with a bus system including, for example, a computerised controller, the processing unit preferably has an interface unit which receives a code generated dependent upon the detected data streams present at its two sensing units and converts that code to a standardised format for supply to the bus. For example, the interface unit may convert the generated code to a known AS-i bus standard.

Each data stream advantageously comprises a stream of binary data, the first and second streams being dissimilar such that on linking by the third sensor, the linked data stream can be distinguished from the first and second streams. Preferably, therefore, each of the first and second data streams comprise a repeating string of binary data, of the same bit length and bit rate. In a typical system, each of the two data streams may comprise different four-bit binary codes.

Though satisfactory operation may be obtained by the third sensor linking the data sources of the processing unit, preferably that sensor serves to link together the first and second sensing inputs such that both sensing inputs will receive the same data streams when the third sensor is active, to effect the linking. So long as the two originating data streams are different, then the linked data stream can be distinguished from the originating streams, though typically the processing unit will look at both sensing inputs, in deciding whether there is an error condition.

Each of the first, second and third sensors preferably comprises a mechanical switch. The first sensor may be a normally-open switch held closed by the electrically-released latch other than when the latch is energised. The second sensor may be a normally-open switch which is held closed by the door, when the door is closed, whereas the third sensor may be a normally-closed switch which is held open by the door, so long as the door remains closed.

The preferred form of electrically-released latch has a latch member which co-acts with a part of the door to hold the door closed but which is moved to a released position to free the door on energisation of the solenoid. In this case, the first sensor may sense the position of the latch member, the latch member being arranged so that it is mechanically held in its released position on moving the door away from its closed position. In this way, following energisation of the solenoid to release the door, the energisation of the solenoid may be removed once the door has been opened, without triggering the first sensor to generate an error condition.

In FIGS. 1 to 4 there is shown a specific embodiment of control apparatus of this invention, suitable for use with an AS-i bus system, to form a part of an overall industrial machinery or process control system. The control apparatus is associated with a door (not shown) moveable between closed and open positions, the machinery or process being protected by the door when in its closed position but access to that machinery or process being possible when the door is in its open position. The door is associated with an electrically-operated latch mechanism having a latch member which serves to hold the door closed. The mechanism includes the solenoid which, when energised, moves the latch member to free the door and so permit the door to be moved to its open position.

The apparatus includes three switches S1, S2 and S3, S1 is associated with the latch mechanism (FIGS. 5 to 7) and monitors the position of the latch member. S1 is normally closed but is opened when the solenoid is energised to move the latch member. S2 is normally open but is closed when the door is in its closed position, the switch opening on the door moving away from its closed position. S3 is normally closed but is held in its open position by the door so long as the door is in its closed position, but irrespective of whether the door is locked closed or is free to open, following energisation of the solenoid.

The apparatus has a processing unit 10 provided with a code generator 11. This code generator has two data stream source outputs A1 and A3 and two sensing inputs A2 and A4. A repeating four-bit binary code is output at A1 and a similar—but different—repeating four-bit binary code of the same bit rate and phase is output at A3. Switch S1 serves, when closed, to connect source A1 to sensing input A2 and switch S2 serves, when closed, to connect source A3 to sensing input A4. Switch S3 is connected between the sensing inputs A2 and A4 and so, when closed, ensures the signals present at sensing inputs A2 and A4 are the same.

Within the code generator 11, the signals present at sensing inputs A2 and A4 are compared with the signals supplied to the outputs A1 and A3. As a result of that comparison, a four-bit code D0–D3 is generated and sent to an AS-i interface unit 12, which generates a suitable signal for supplying to a two-wire AS-i system bus 13. In the event that the apparatus is to be used with a different system bus, it is a relatively easy matter to change the AS-i interface unit 12 for some other interface unit appropriate for the different system bus.

FIGS. 1A and 1B show normal operation, where the door is locked in its closed position—that is, the solenoid has not been energised and so the door cannot be opened. Switches S1 and S2 are closed and switch S3 is open. In this example, and as shown in the table of FIG. 1B, the data stream sourced at A1 is the four-bit binary sequence 1001, whereas the data stream sourced at A3 is a four-bit binary sequence 1010 synchronised to the stream sourced at A1. The code generator 11 detects the binary sequences 1001 and 1010 respectively on inputs A2 and A4 and so a suitable code is sent on data lines D0, D1, D2 and D3 to the AS-i interface to show that the system is operating normally and that the machinery or process may be enabled. In this case, two four-bit nibbles are sent sequentially on data lines D0, D1, D2 and D4, these being the sequence 10011010, and the AS-i bus interface then produces a suitable corresponding signal to send to the bus 13.

Figure 2A:
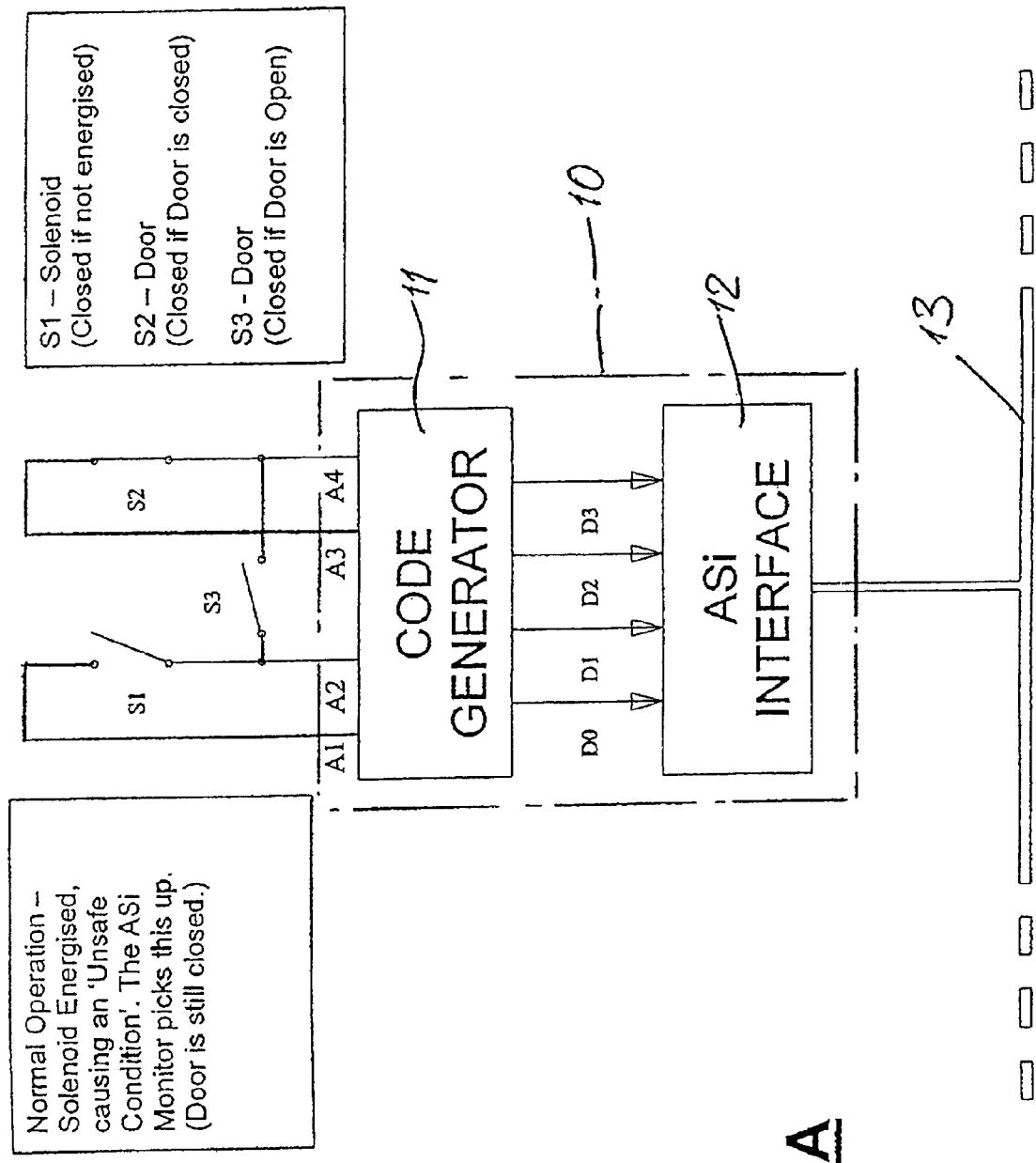
FIGS. 2A, 3A and 4A are similar to FIG. 1A but with the apparatus in other conditions as will be described below.

FIGS. 2A and 2B also show normal operation, but where the solenoid has been energised so permitting the door to be opened. This is an unsafe condition even though the door is still closed. As with FIG. 1B the binary sequence 1010 appears on input A4 but as switch S1 has been opened on energisation of the solenoid, the sequence 0000 is present on A2. The eight-bit code 00001010 is sent to the AS-i interface, which produces a suitable code for an associated process controller to recognise that the machinery or process must be inhibited.

Figure 3A:
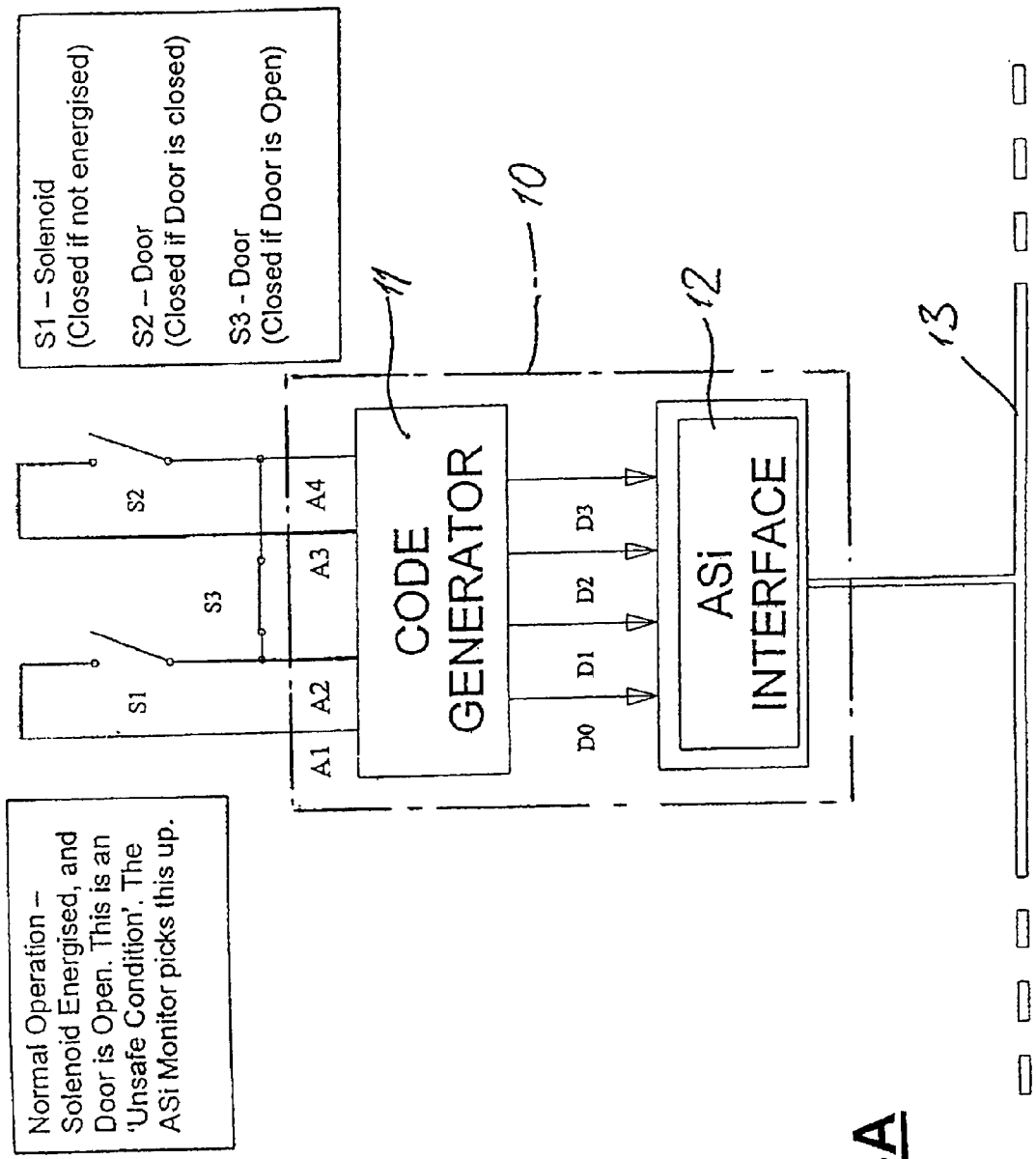

FIGS. 3A and 3B show the situation when the door has been opened, which is an unsafe condition. The binary sequence received on inputs A2 and A4 is, in each case, 0000 and the eight-bit code supplied to the AS-i interface is 00000000. The code then sent to the AS-i bus indicates that all processing is to be inhibited.

For normal operation to continue, the door would be closed at some point and then processing would continue as in FIG. 1B. If however a fault occurs or if someone attempts to perform unauthorised operation, such as by falsely closing S1 and/or S2, this would be immediately recognised by the process controller which could issue suitable alarm signals as well as continue to inhibit operation of the machinery or process. For instance, were switch S1 to be closed, but not S2, the inputs at both A2 and A4 would be 1001, as switch S3 would still be closed, leading to the code 10011001 being supplied to the AS-i interface. The resultant code sent to the bus would be recognised as indicating an error condition.

Figure 4A:
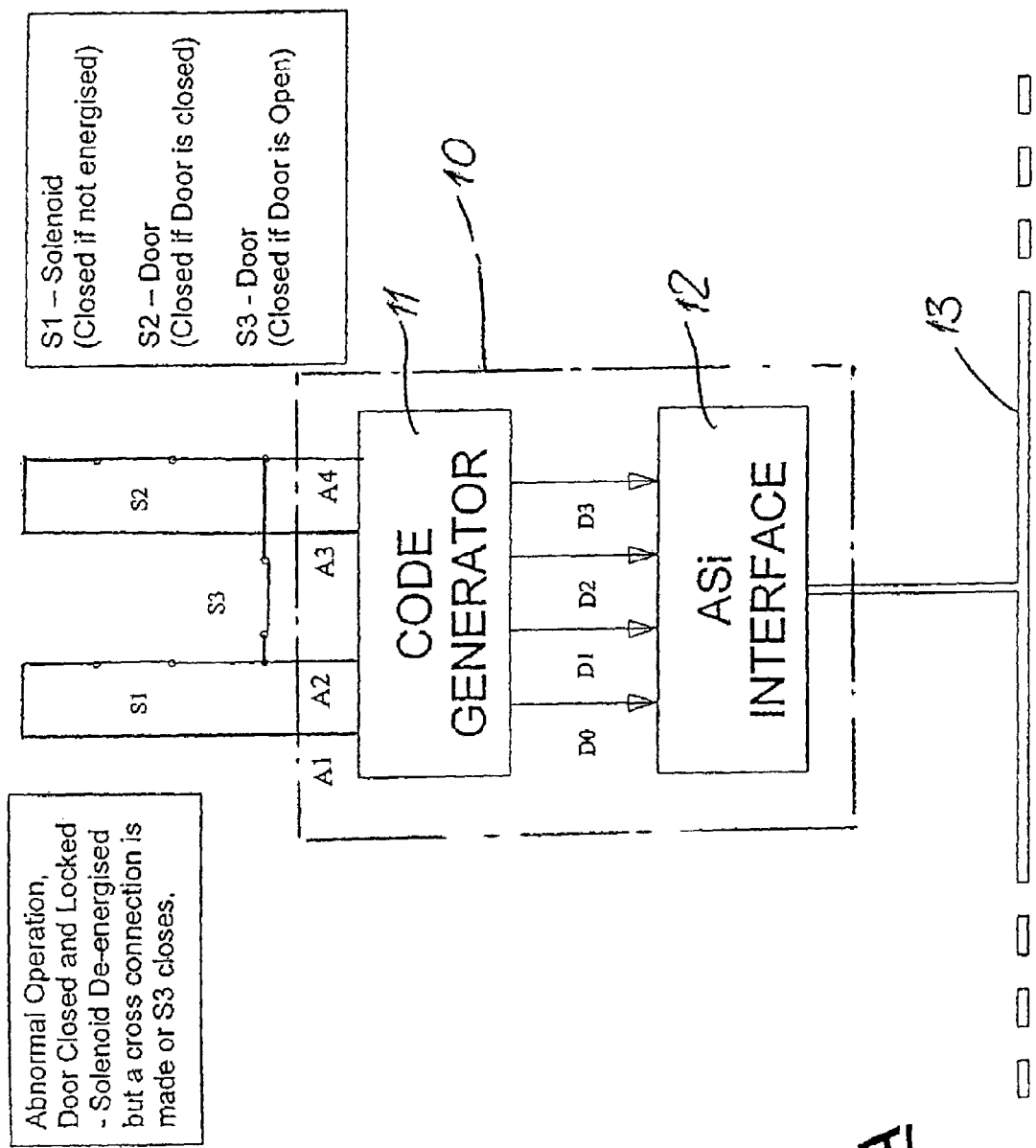

FIGS. 4A and 4B illustrate an abnormal operation. Here, the door is locked in its closed position and the solenoid is not energised. Thus, as with FIG. 1A, S1 and S2 are closed. S3 remains closed indicating that the door is still open or that there is a wiring fault. In this case, the high fourth bit of stream A1 is pulled low by the zero fourth bit of stream A3, and the zero third bit of stream A1 pulls the third bit of stream A3 low. As a result, the binary sequences received on A2 and A4 are the same and are both 1000, leading to an appropriate code being supplied to the AS-i bus. Again, the process controller will recognise this code as a fault condition and so inhibit operation of the machinery or process.

The above example is a relatively simple implementation, but more complex data processing could be involved, permitting the process controller to distinguish between the channels being monitored. In such a more complex installation where there are several control apparatii similar to that described and all supplying data to the AS-i bus, each one may have a different code sourced at the respective A1 terminal of the code generator. Then, the code generator could supply on data lines D0, D1, D2 and D3 eight sequential four-bit nibbles which the AS-i interface processes to supply an appropriate code to the AS-i bus, allowing the process controller to be aware of which channels are being monitored, and in the event of a fault or abnormal operation, which channel has given rise to that condition.

Figure 5:
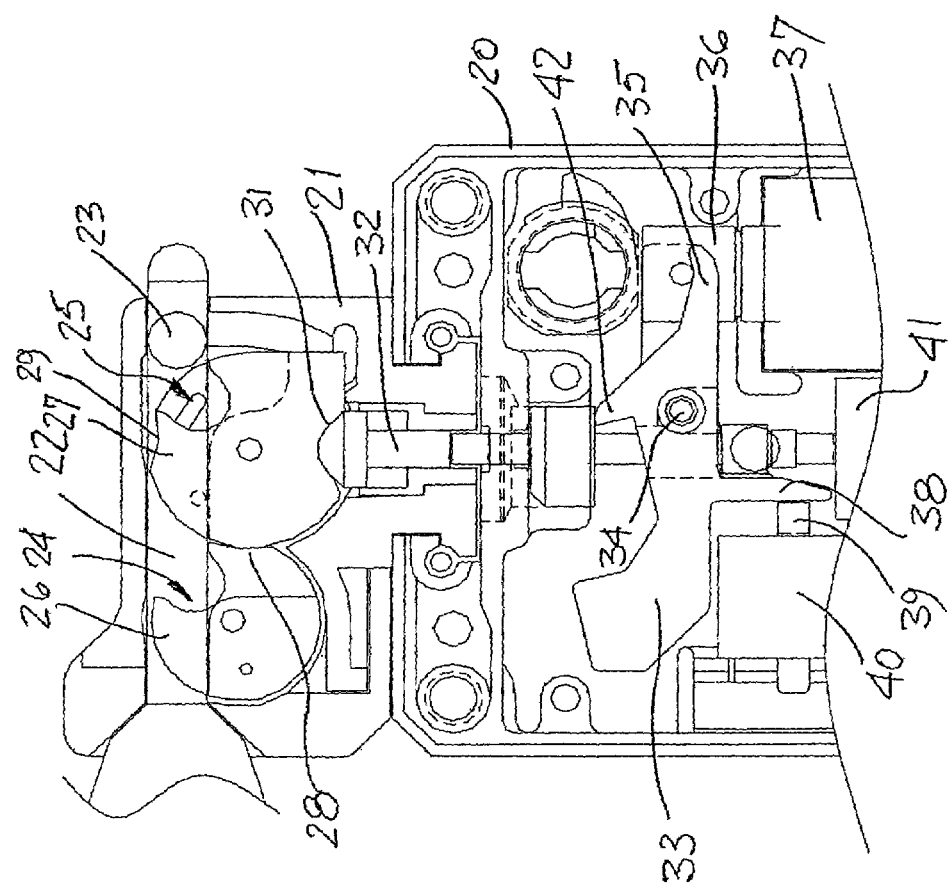
FIGS. 5 to 7 are three drawings showing the mechanical arrangement of a solenoid-operated latch for the door, controlled by the apparatus.
Figure 6:
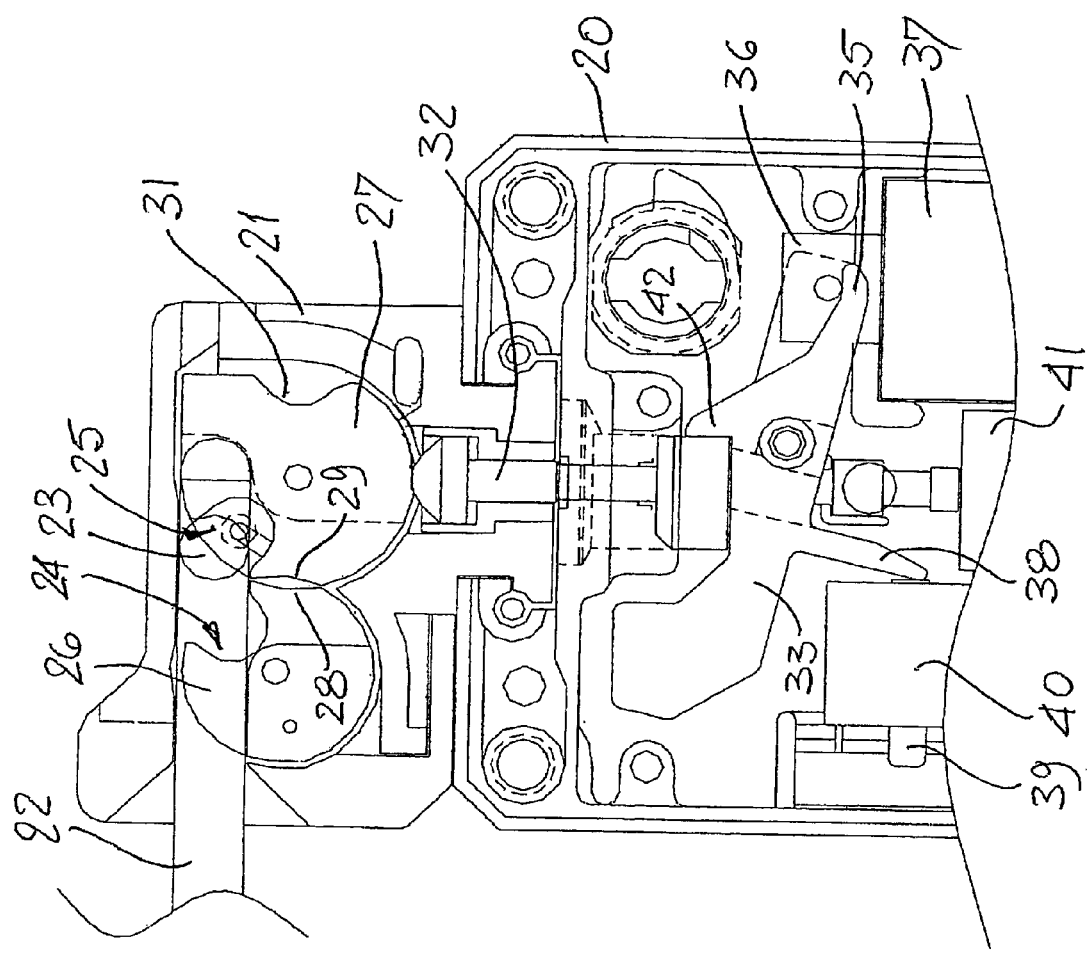
Figure 7:
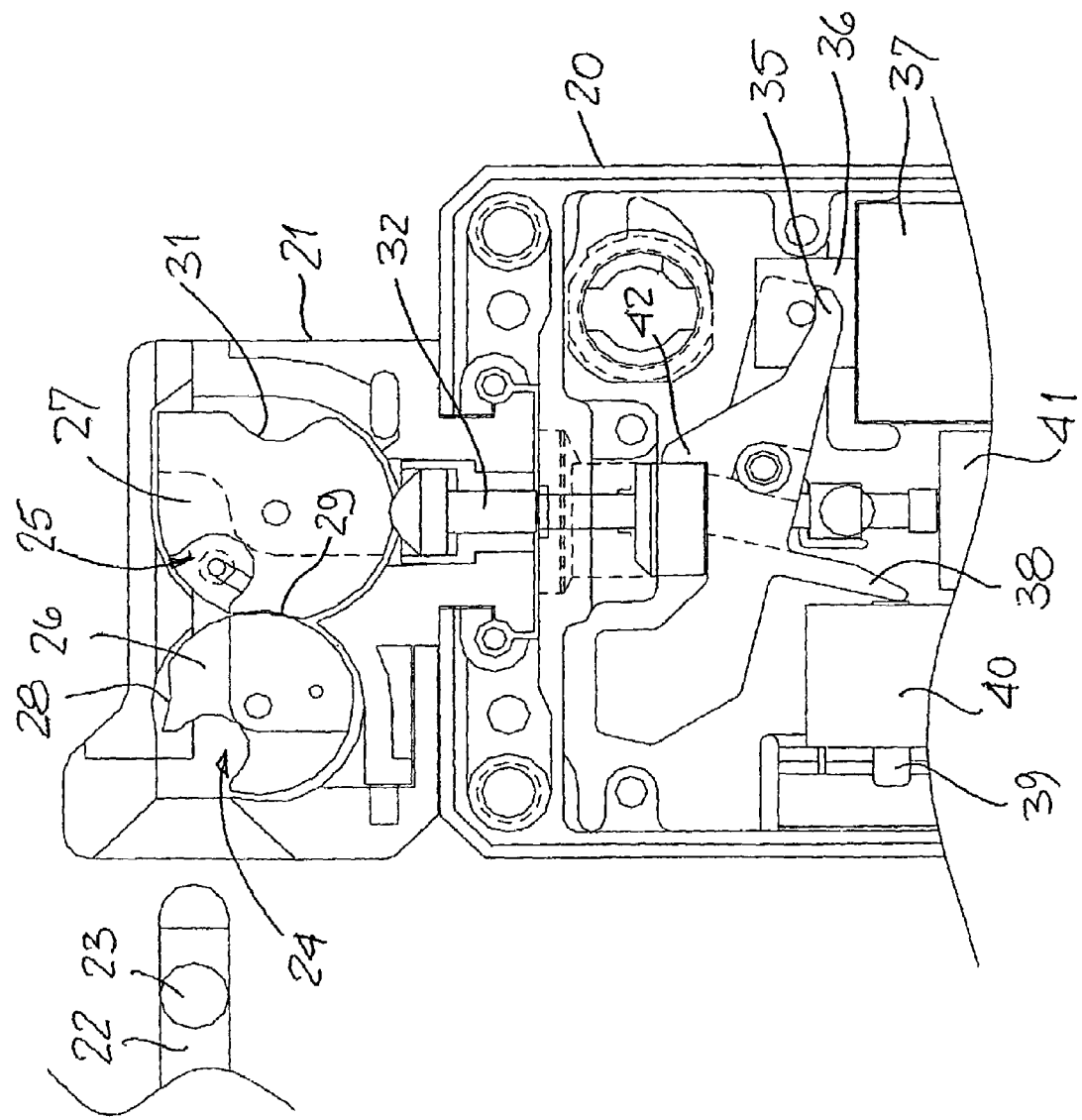

FIGS. 5 to 7 illustrate a mechanism for locking the door shut and electrically releasing the door, in a system as described above. The mechanism includes a housing 20 to one end of which is connected a latch mechanism 21. The door (not shown) has a bolt 22 projecting therefrom and which can be received in a bore provided in the latch mechanism 21, which bore has a bell-mouth in order to facilitate entry of the bolt into the bore. A transverse pin 23 is provided on the bolt 22 and is engageable with recesses 24 and 25 formed respectively in wheels 26 and 27 rotatably mounted within the latch mechanism 21. As shown in FIG. 5, a scallop 28 formed in wheel 26 engages the periphery of wheel 27 and this prevents wheel 26 rotating. Rotation of wheel 27 so that a scallop 29 comes into alignment with wheel 26 then permits wheel 26 to be rotated and as soon as that wheel has turned, its periphery fits into the scallop 29 and prevents rotation of wheel 27.

A detent 31 is also formed in the periphery of wheel 27 which detent may be engaged by a plunger 32 slidably mounted within the latch mechanism and spring-urged upwardly (in the drawing) by a spring (not shown), to engage the periphery of the wheel 27. Movement of the plunger 32 is controlled by a locking plate 33 pivoted at 34 to the housing 20, the locking plate having an arm 35 which is engaged by the armature 36 of a solenoid 37. The locking plate 33 also has a secondary arm 38 which acts on the operating member 39 of a microswitch 40, mounted within the housing. A further microswitch 41 is mounted within the housing to detect the presence or otherwise of the plunger 32 in the detent 31 of wheel 27. A third microswitch (not shown) is provided within the latch mechanism 21 to detect the presence of the bolt in the latch mechanism 21 and so whether the door is in the closed position.

Microswitch 40 corresponds to switch S1 of the discussion hereinbefore, the further microswitch 41 to switch S3 and the third microswitch to switch S2.

FIG. 5 shows the mechanism in its condition with the bolt 22 in the latch mechanism 21, with wheel 27 locked against rotation by plunger 32 engaging detent 31 of wheel 27. Wheel 27 holds wheel 26 against rotation and the plunger is prevented from moving out of the detent 31 by projection 42 engaging a shoulder on the plunger. The third microswitch detects the presence of the bolt 22 in the latch mechanism, and so detects that the door is closed. Microswitch 40 detects that the locking plate 33 is in its initial position and so that the solenoid is not energised. The door cannot be opened because the bolt 22 cannot be withdrawn from the latch mechanism 21, in view of transverse pin 23 engaging wheel 27, in turn held against rotation.

On energising the solenoid 37, its armature 36 moves deeper into the solenoid, so rotating the locking plate clockwise. This moves projection 42 clear of the shoulder on the plunger 32, allowing the plunger to be moved axially, by rotation of wheel 27 driving the plunger out of the detent 31. At the same time, the secondary arm 38 operates microswitch 40, to show that the solenoid has been energised. FIG. 6 shows the condition after energisation of the solenoid and partial movement of the door; the plunger 32 has been moved downwardly (in the drawing) by the rotation of wheel 27, against the action of the spring acting on the plunger. Wheel 27 has been rotated by the action of transverse pin 23 engaged in recess 25 in wheel 27, sufficiently for the pin 23 to transfer into the recess 24 in wheel 26. As this occurs, both microswitch 41 and the third microswitch are operated, respectively by the plunger 32 and the movement of the bolt 22 out of the latch mechanism 21.

Once the wheel 27 has turned sufficiently to permit the transverse pin 23 to enter recess 24 of wheel 26, the scallop of wheel 27 is aligned with wheel 26 so permitting that wheel to turn and then locking wheel 27 against further rotation. Thereafter wheel 26 may turn sufficiently for the bolt 22 to come completely free of the latch mechanism 21 as shown in FIG. 7. The solenoid may now be de-energised but the locking plate 33 cannot turn counter-clockwise by virtue of the engagement of its projection 42 with the side of the plunger. The spring force acting on the plunger 32 cannot drive the plunger upwardly as the detent 31 on wheel 27 is out of alignment with the plunger.

The arrangement described above ensures that there are two separate sensors for the door-closed position (further microswitch 41 and the third microswitch) and that the solenoid may be de-energised following opening of the door without resetting the microswitch 40 associated with operation of the solenoid. Thus, since microswitch 40 is opened on operation of the solenoid, that microswitch will remain open once the door has been opened whether or not the solenoid remains energised. Closing of the door to reset the mechanism to the condition shown in FIG. 5 allows the microswitch 40 to close once more.

The invention claimed is:

1. Control apparatus for a door-locking mechanism including an electrically-released latch for locking the door closed, which apparatus comprises:
    a processing unit having first and second data stream sources and first and second sensing inputs;
    a first sensor associated with the electrically released latch and which serves to connect the first data stream source to the first sensing input other than when the latch is in its released state;
    a second sensor associated with the door and which serves to connect the second data stream source to the second sensing input so long as the door remains closed; and
    a third sensor also associated with the door and which serves to link together one of the first and second data stream sources and the first and second inputs when the door is not closed;
    the processing unit being arranged to output a signal indicative of an error condition should the data stream appearing at least at one of the sensing inputs not be the data stream which normally should appear at that input.

2. Control apparatus as claimed in claim 1, wherein the first and second data streams comprise binary data streams, the first and second streams being of different data.

3. Control apparatus as claimed in claim 2, wherein each of the first and second data streams comprises a repeating string of binary data, the two strings being of the same bit length and bit rate.

4. Control apparatus as claimed in claim 3, wherein the two data strings comprise different four-bit binary codes.

5. Control apparatus as claimed in claim 1, wherein processing unit includes a code generator which outputs a digital code dependant upon the detected data streams present at its two sensing inputs.

6. Control apparatus as claimed in claim 5, wherein the processing unit includes an interface unit which receives the generated code and converts that code to a standardised format for supply to an information bus to which the apparatus is connected.

7. Control apparatus as claimed in claim 1, wherein the third sensor serves to link together the first and second sensing inputs.

8. Control apparatus as claimed in claim 1, wherein the first sensor comprises a first switch which is closed so long as the electrically-released latch is in its door-locked position.

9. Control apparatus as claimed in claim 8, wherein the first switch is a normally-open switch held closed by the electrically-released latch other than when energised.

10. Control apparatus as claimed in claim 8, wherein the electrically-released latch includes a latch member which co-acts with a part of the door to hold the door closed, the latch member being moved by energisation of a solenoid to a released position to free the door, operation of the solenoid being controlled by the processing unit.

11. Control apparatus as claimed in claim 10, wherein the first sensor senses the position of the latch member.

12. Control apparatus as claimed in claim 11, wherein the latch member is arranged so that it is mechanically held in its released position on moving the door away from its closed position, irrespective of energisation of the solenoid.

13. Control apparatus as claimed in claim 1, wherein the second sensor comprises a second switch which is closed so long as the door remains closed.

14. Control apparatus as claimed in claim 13, wherein the second switch is a normally-open switch which is held closed by the door, when the door is closed.

15. Control apparatus as claimed in claim 1, wherein the third sensor comprises a third switch which is open so long as the door remains closed.

16. Control apparatus as claimed in claim 15, wherein the third switch is a normally-closed switch which is held open by the door, so long as the door remains closed.

17. Control apparatus for a door-locking mechanism including an electrically-released latch for locking the door closed, which apparatus comprises:
    a processing unit having:
        (a) first and second data stream sources outputting first and second repeating strings of binary data, the two strings being of the same bit length and bit rate;
        (b) first and second sensing inputs for data streams;
        (c) a code generator which outputs a digital code dependant upon the data streams present at said two sensing inputs; and
        (d) an interface unit which receives the generated digital code and converts that code to a standardised format for supply to an information bus to which the apparatus is connected;
    a normally-open first switch associated with the electrically released latch and which serves to connect the first data stream source to the first sensing input other than when the latch is in its released state;
    a normally-open second switch sensor associated with the door and which serves to connect the second data stream source to the second sensing input so long as the door remains closed; and
    a normally-closed third switch also associated with the door and which serves to link together the first and second inputs when the door is not closed;
    the code generator of the processing unit being arranged to output a digital code indicative of an error condition should the data stream appearing at least at one of the sensing inputs not be the data stream which normally should appear at that input, which digital code is transferred through the interface unit to said information bus.

18. A method of monitoring the state of a door fitted with an electrically-released latch which, when energised, allows the door to be opened, in which method:
    a processing unit sources first and second data streams and has first and second sensing inputs;

the first data stream is connected to the first sensing input by a first sensor associated with the electrically released latch other than when the latch is in its released state;

the second data stream is connected to the second sensing input by a second sensor associated with the door so long as the door remains closed; and either the first and second sources or the first and second sensing inputs are linked together by a third sensor also associated with the door, whenever the door is not closed;

the processing unit outputting a signal indicative of an error condition should the data stream appearing at least at one of the sensing inputs not be the data stream which normally should appear at that input.

19. A method as claimed in claim 18, wherein the first and second data streams comprise binary data streams, the first and second streams being of different data.

20. A method as claimed in claim 19, wherein each of the first and second data streams comprise a repeating string of binary data, the two strings being of the same bit length.

21. A method as claimed in claim 20, wherein the two data strings comprise different four-bit binary codes.

22. A method as claimed in claim 18, wherein the processing unit outputs a digital code which depends upon the detected data streams present at the two sensing inputs.

23. A method as claimed in claim 22, wherein the digital code which is generated by the processing unit is further processed by an interface unit which receives and converts the generated code to a standardised format for an information bus.

* * * * *